United States Patent
Yamashita et al.

(10) Patent No.: US 10,089,201 B2
(45) Date of Patent: Oct. 2, 2018

(54) STORAGE DEVICE, STORAGE SYSTEM AND NON-TRANSITORY COMPUTER-READABLE STORAGE MEDIUM FOR MIRRORING OF DATA

(71) Applicant: FUJITSU LIMITED, Kawasaki-shi, Kanagawa (JP)

(72) Inventors: Hiroyuki Yamashita, Nagoya (JP); Tomohiro Uno, Nagoya (JP); Yasuhito Kikuchi, Kawasaki (JP); Yoshimasa Mishuku, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/748,652

(22) Filed: Jun. 24, 2015

(65) Prior Publication Data
US 2016/0026398 A1 Jan. 28, 2016

(30) Foreign Application Priority Data

Jul. 22, 2014 (JP) ................. 2014-149078

(51) Int. Cl.
*G06F 11/00* (2006.01)
*G06F 11/20* (2006.01)

(52) U.S. Cl.
CPC ...... *G06F 11/2079* (2013.01); *G06F 11/2058* (2013.01)

(58) Field of Classification Search
CPC ............. G06F 11/2058; G06F 11/2069; G06F 11/2071
USPC ....................................... 714/6.23
See application file for complete search history.

(56) References Cited

U.S. PATENT DOCUMENTS

| | | | | |
|---|---|---|---|---|
| 8,443,140 | B2* | 5/2013 | Takeuchi | G06F 3/0613 711/113 |
| 8,700,948 | B2* | 4/2014 | Masaki | G06F 11/1092 711/114 |
| 2003/0172149 | A1 | 9/2003 | Edsall et al. | |
| 2006/0036648 | A1 | 2/2006 | Frey et al. | |
| 2008/0010496 | A1 | 1/2008 | Das et al. | |
| 2008/0104360 | A1* | 5/2008 | Takeuchi | G06F 3/061 711/203 |
| 2008/0162605 | A1 | 7/2008 | Tsuchiya | |
| 2009/0259816 | A1* | 10/2009 | Sharma | G06F 11/2064 711/162 |
| 2010/0138687 | A1* | 6/2010 | Noguchi | G06F 11/0727 714/47.1 |

(Continued)

FOREIGN PATENT DOCUMENTS

| | | |
|---|---|---|
| JP | 2005-525619 A | 8/2005 |
| JP | 2007-328785 | 12/2007 |

(Continued)

OTHER PUBLICATIONS

Japanese Office Action dated Feb. 20, 2018 for corresponding Japanese Patent Application No. 2014-149079, with English Translation, 6 pages.

*Primary Examiner* — Elmira Mehrmanesh
(74) *Attorney, Agent, or Firm* — Fujitsu Patent Center

(57) ABSTRACT

A virtualization controller identifies a node that manages a segment to be accessed, and instructs the node to access the segment. A mirror controller of the node instructed to access the segment writes data in the segment managed by the node and in a segment having a mirror relation with the segment managed by the node.

4 Claims, 10 Drawing Sheets

(56) References Cited

U.S. PATENT DOCUMENTS

| | | | |
|---|---|---|---|
| 2011/0197040 A1* | 8/2011 | Oogai | G06F 11/2058 |
| | | | 711/162 |
| 2011/0238915 A1* | 9/2011 | Kikuchi | G06F 12/0866 |
| | | | 711/118 |
| 2012/0084522 A1* | 4/2012 | Shiomi | G06F 3/061 |
| | | | 711/162 |

FOREIGN PATENT DOCUMENTS

| | | |
|---|---|---|
| JP | 2007-535763 | 12/2007 |
| JP | 2008-165431 A | 7/2018 |
| WO | 2005111811 | 11/2005 |

\* cited by examiner

STORAGE DEVICE, STORAGE SYSTEM AND NON-TRANSITORY COMPUTER-READABLE STORAGE MEDIUM FOR MIRRORING OF DATA

CROSS-REFERENCE TO RELATED APPLICATION(S)

This application is based upon and claims the benefit of priority of the prior Japanese Patent Application No. 2014-149078, filed on Jul. 22, 2014, the entire contents of which are incorporated herein by reference.

FIELD

The embodiments discussed herein are related to a storage device and a storage system.

BACKGROUND

In recent years, the utilization of a virtual storage system capable of achieving unrestricted capacity and configuration thereof regardless of the volume configuration and capacity of a physical storage system has been progressing. In the virtual storage system, a virtual volume is provided as a management unit of a storage system.

The virtual storage system multiplexes, assuming that failures occur in a storage device that stores data, a logical unit number (LUN) that constitutes the virtual volume to perform mirroring of data.

The virtual storage system performs the mirroring of data to continue I/O via a LUN other than a LUN associated with the storage device in which failures occur, thus improving the availability thereof as a storage.

Here, there exists a conventional technique that allows a user to select, out of a plurality of volume groups, only a part of the volume groups as a target of mirroring, thus specifying a fail-back operation only to specific volume groups by the user.

Patent Document 1: Japanese Laid-open Patent Publication No. 2007-328785
Patent Document 2: Japanese Laid-open Patent Publication No. 2007-535763

When the mirroring is performed in an active/active virtual storage system, there exists a drawback that data mismatching may occur in mirroring. Here, the "active/active" means a system in which an access request from a business server that uses a virtual storage system can be received by any storage device in the virtual storage system. On the other hand, a system in which the access request from the business server is received only by an active storage device is referred to as "active/standby".

The active/active system requires complicated processing. However, the active/active system has advantages such as load distribution or quick recovery from a failure and hence, there exists a tendency that the use of the active/active virtual storage system increases.

FIG. 10 is a view for explaining a drawback of mirroring in the active/active system. In FIG. 10, each of two nodes 9 illustrated as a node #1 and a node #2 is a storage device that performs mirroring of data, and VDisk indicates a virtual volume.

As illustrated in FIG. 10, a business server 10 requests the node #1 to write data A in the VDisk a (1), and requests the node #2 to write data B in the VDisk a (2). Furthermore, the node #2 writes the data B in an intended disk device 41 in a storage part of the node #1 (3) and thereafter, the node #1 writes the data A in the disk device 41 of the node #1 (4).

Meanwhile, the node #1 writes the data A in the disk device 41 of the node #2 (5) and thereafter, the node #2 writes the data B in an intended disk device 41 in a storage unit of the node #2 (6). In this case, as data written in the VDisk a, while the data A is stored in the disk device 41 of the node #1, the data B is stored in the disk device 41 of the node #2.

In this manner, in the active/active system, all the volumes are accessible from any of nodes 9 in a virtual storage system and hence, the simultaneous writing control of an identical virtual volume may be performed by a plurality of controllers different from each other of the respective nodes 9. A controller that has received a write request performs writing control and mirroring control with respect to a mirror destination. In this case, it is impossible to control the order of writing data in the disk devices 41 allocated to the virtual volume. Accordingly, as described above, there exists the possibility that data are written in different orders between the disk devices arranged in the respective nodes as a mirror source and a mirror destination, and data mismatching occurs in mirroring.

SUMMARY

According to an aspect of an embodiment, a storage apparatus that constitutes a storage system in cooperation with other storage apparatuses each including a controller that is capable of receiving an access request and performs certain processing on the access request includes a storage that stores therein data in a predefined unit of storage; and a controller that is capable of receiving an access request to the storage system, and performs predefined processing on the access request, wherein the controller performs, when receiving a write access request, processing for identifying a controller, out of a plurality of controllers of storage apparatuses that constitute the storage system, that performs mirror control for storing data, by mirroring, in an original storage and a mirror destination storage in a predefined unit of storage, and performs the mirror control corresponding to the writing access request when identified, by the processing for identifying, that the controller that has received the access request is a controller that performs mirror control.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred Embodiments of the Present Invention will be explained with reference to accompanying drawings. Techniques disclosed herein are not limited to the embodiments.

[a] First Embodiment

Figure 1:
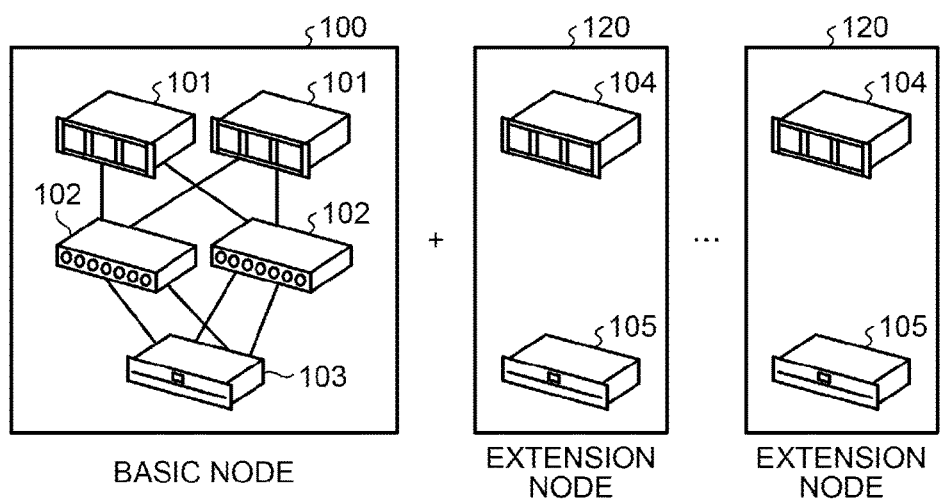
FIG. 1 is a view for explaining a scale-out type virtual storage system.

First of all, a scale-out type virtual storage system is explained. FIG. 1 is a view for explaining the scale-out type virtual storage system. As illustrated in FIG. 1, the scale-out type virtual storage system is a virtual storage system capable of increasing a storage capacity in a unit of node. Here, a node is a storage device including at least a controller (control unit) and a storage part (storage unit) provided with a plurality of disk devices in the housing of the storage device.

In FIG. 1, a basic node 100 includes two control units 101, two switches 102, and a storage unit 103 in the housing thereof. The virtual storage system is configured by serially adding extension nodes 120 each including a control unit 104 and a storage unit 105 to the basic node 100, thus achieving the extension (scale-out) of the performance and the storage capacity thereof. Here, in each node, although one storage unit is illustrated, an arbitrary number of storage units may be provided as the storage part.

Figure 2:
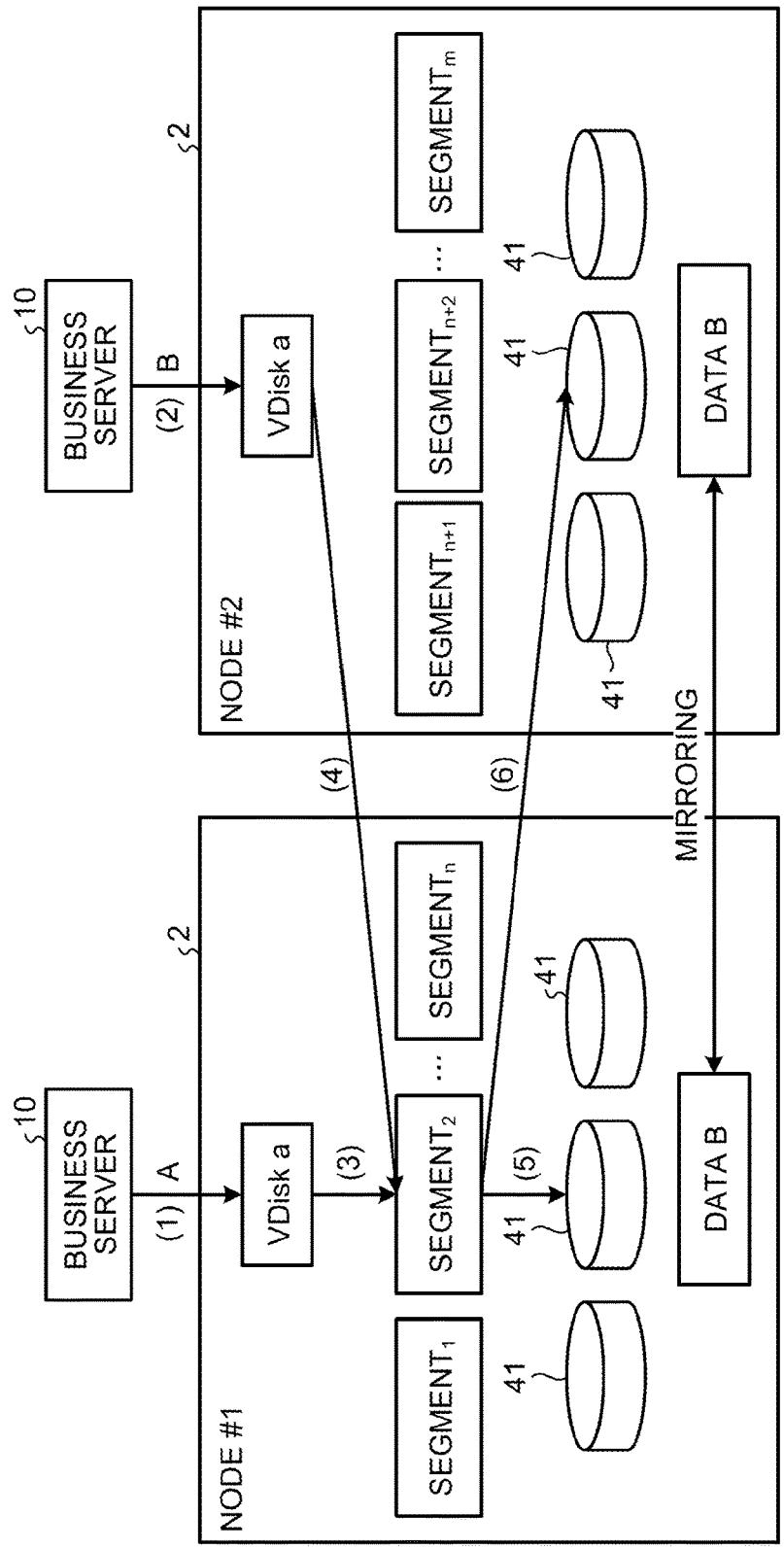
FIG. 2 is a view for explaining mirroring control in a virtual storage system according to a first embodiment.

Next, mirroring control in the virtual storage system according to the first embodiment is explained. FIG. 2 is a view for explaining the mirroring control in the virtual storage system according to the first embodiment. Here, the virtual storage system according to the first embodiment is a scale-out type active/active virtual storage system. An operation state after an extension node is added and scale-out processing is completed is illustrated in FIG. 2.

Furthermore, the virtual storage system according to the first embodiment is an active/active virtual storage system and hence, a controller of each node is capable of receiving a write request directly. The node that has received the write request determines whether a physical storage area corresponding to an intended virtual storage area of a virtual disk is allocated to a disk device of the storage part under the control of the node. When the physical storage area is under the control of the node, the node performs writing control and mirroring control with respect to a mirror destination. When the physical storage area is under the control of another node, the node that has received the write request instructs a controller of the other node to perform the writing control and the mirroring control. That is, the writing control and the mirroring control are collectively performed by a controller of a node that manages the control of the intended physical storage area. Therefore, it is possible to prevent simultaneous writing control with respect to one virtual volume from being performed by a plurality of controllers.

In FIG. 2, a VDisk a is associated with a segment to a segment$_m$ in disk devices of storage units. The segment to a segment$_n$ are controlled by a controller of a node #1, and a segment$_{n+1}$ to segment$_m$ are controlled by a controller of a node #2. Here, a segment is one of a plurality of management units into which a volume is divided.

Write control of data with respect to the segment to the segment$_n$, including mirroring with respect to a mirror destination, is performed by the controller of the node #1. Write control of data with respect to the segment to the segment$_m$, including mirroring with respect to a mirror destination, is performed by the node #2. Here, 2n is approximately equal to m. Although only two nodes 2 are illustrated in FIG. 2 for the sake of explanation, the virtual storage system according to the first embodiment has an arbitrary number of nodes 2.

That is, in the virtual storage system according to the first embodiment, each of a plurality of segments associated with a virtual volume is controlled by a controller of one of the nodes 2 that includes a storage part to which a physical storage destination corresponding to the segment is allocated. The segments associated with the virtual volume are controlled so as to be arranged in a uniformly distributed manner among the nodes 2 as much as possible (wide striping). Furthermore, write control of data with respect to each segment, including mirroring with respect to a mirror destination, is controlled by a controller of the node that controls the segment.

For example, a business server 10 that is a host device requests the node #1 to write data A in the VDisk a (1), and requests the node #2 to write data B in the VDisk a (2). Here, it is supposed that the data A and the data B are written in a segment$_2$.

The node #1 determines whether the segment$_2$ is allocated to the physical storage area under the control of the node #1 based on management information. Because the segment$_2$ is allocated to the physical storage area under the control of the node #1, the node #1 controls the writing of the data A in the segment$_2$ (3) in the node #1 and also controls mirroring. That is, the node #1 writes the data A in a disk device (5) and instructs the node #2 that is a mirror destination to perform writing of the data A (6).

The node #2 that is requested to write the data B in the VDisk a determines whether the segment$_2$ is allocated to the physical storage area under the control of the node #2 based on the management information. Because the segment$_2$ is allocated to the physical storage area under the control of the node #1, the node #2 requests the node #1 to write the data B in the segment$_2$ (4). The node #1 then writes the data B in a disk device (5) and instructs the node #2 that is a mirror destination to perform writing of the data B (6).

In this manner, in the virtual storage system according to the first embodiment, a node that manages a segment controls writing of data in the segment including mirroring with respect to a mirror destination. Accordingly, it is possible to prevent the occurrence of mismatching between mirror data in the mirroring control particularly when different controllers receive write requests.

Figure 3:
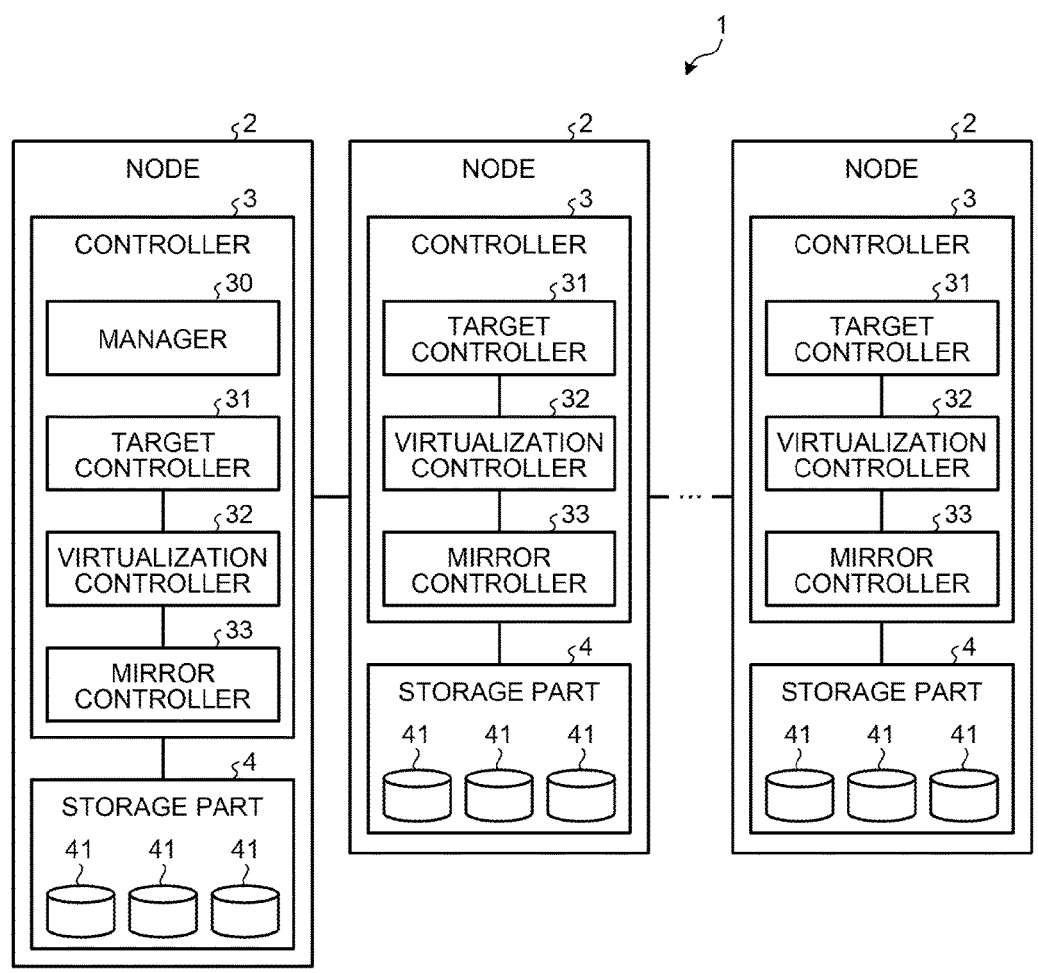
FIG. 3 is a view illustrating a configuration of the virtual storage system according to the first embodiment.

Next, a configuration of the virtual storage system according to the first embodiment is explained. FIG. 3 is a view illustrating the configuration of the virtual storage system according to the first embodiment. As illustrated in FIG. 3, a virtual storage system 1 is a scale-out type virtual storage system having an arbitrary number of nodes 2.

The node 2 has a controller 3 that performs control of the node 2, communications with other nodes 2, or the like, and a storage part 4 that stores data used by the business server 10 in the disk devices 41. The controller 3 has a manager 30, a target controller 31, a virtualization controller 32, and a mirror controller 33.

The manager 30 controls all the nodes 2 to operate the virtual storage system 1 as one system. The manager 30 exists only in one node 2. The creation of volumes, updating of configuration information, and the like are performed by the node 2 having the manager 30.

The target controller 31 discloses virtual volumes, such as a standard volume, a thin provisioned volume, a mirror volume, or the like to the business server 10, and receives an access to the relevant volume from the business server 10. Here, the thin provisioned volume is a volume allocated to a physical volume in actually writing data, and the mirror volume is a volume in which mirror data are stored.

The virtualization controller 32 controls virtualization by receiving an access to a virtual volume from the target controller 31 and converting the access to the virtual volume into an access to the physical volume.

To be more specific, the virtualization controller 32 converts an address to be accessed in the virtual volume into an address of a segment to be accessed in the physical volume, and identifies the node 2 that manages the segment to be accessed. Furthermore, the virtualization controller 32 instructs the identified node 2 to access the segment.

The mirror controller 33 controls an access to a segment managed by the node 2 of the mirror controller 33 and controls an access to a segment having a mirror relation with the segment managed by the node 2 of the mirror controller 33. The mirror controller 33 controls, in the case of write access to the segment managed by the node 2 of the mirror controller 33, the writing of data in the segment managed by the node 2 of the mirror controller 33 and the writing of data in the segment having a mirror relation with the segment managed by the node 2 of the mirror controller 33.

In this manner, the virtualization controller 32 identifies the node 2 that manages the segment to be accessed, and instructs the identified node 2 to access the segment. Furthermore, the mirror controller 33 of the node 2 instructed to access the segment controls, in the case of write access, the writing of data in the segment managed by the node 2 of the mirror controller 33 and the writing of data in the segment having a mirror relation with the segment managed by the node 2 of the mirror controller 33. Therefore, in the virtual storage system 1, it is possible to control the order of write access to the nodes 2, and prevent the occurrence of mismatching between mirror data.

Figure 4:
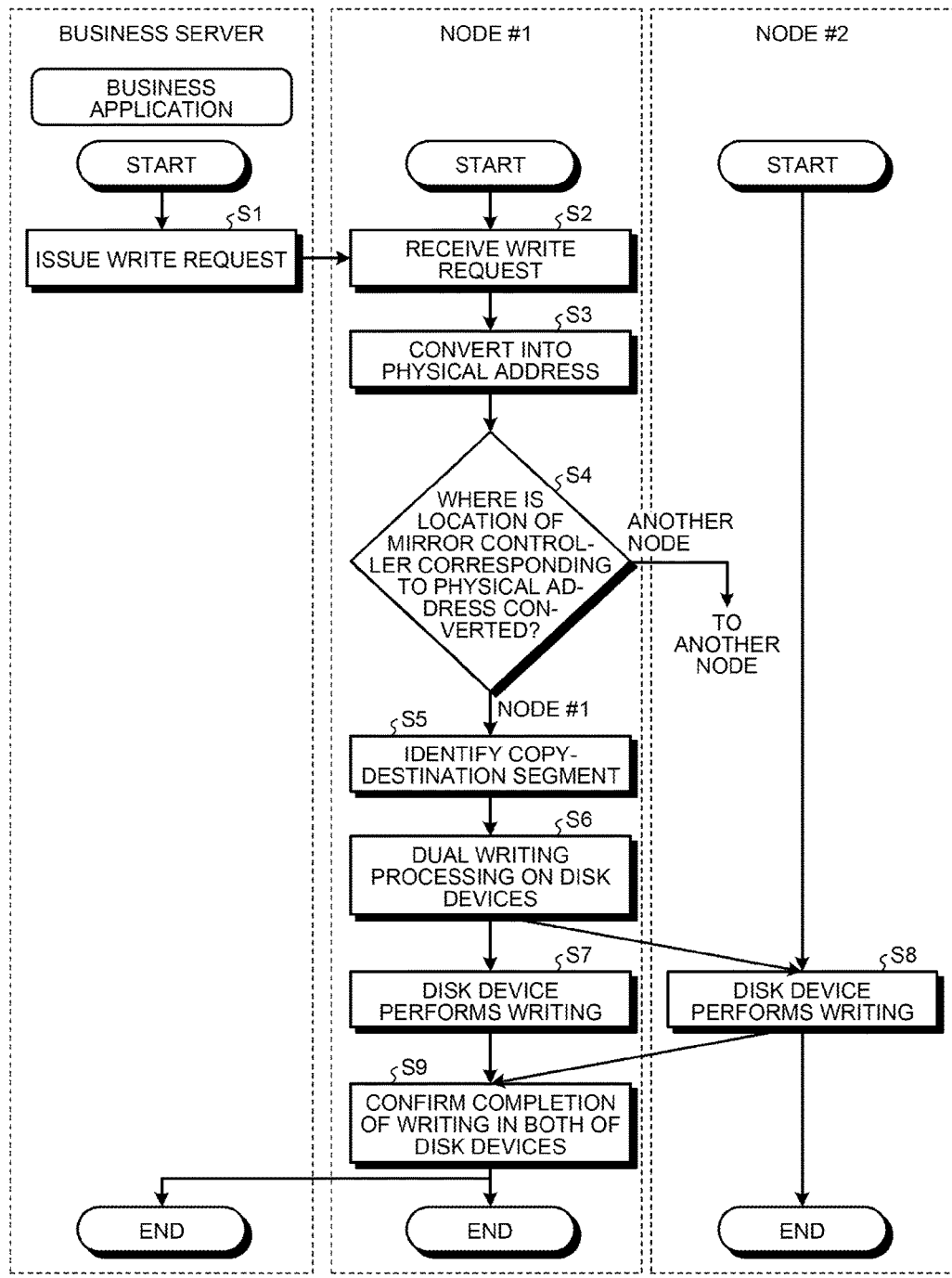
FIG. 4 is a view illustrating a flow of writing processing in the virtual storage system according to the first embodiment.

Next, a flow of writing processing in the virtual storage system 1 according to the first embodiment is explained. FIG. 4 is a view illustrating the flow of the writing processing in the virtual storage system 1 according to the first embodiment.

As illustrated in FIG. 4, a business application that operates in the business server 10 issues a write request to the node #1 (S1). Thereafter, the target controller 31 of the node #1 receives the write request (S2), and transfers the write request to the virtualization controller 32.

The virtualization controller 32 converts an address of a write destination in a virtual volume into a physical address (S3), and identifies a location, which is a node, of the mirror controller 33 corresponding to the converted physical address. Here, a physical address is an address of a segment that is a write destination of data.

The virtualization controller 32 determines the location of the mirror controller 33 corresponding to the physical address (S4). When the location of the mirror controller 33 is in the node #1, the virtualization controller 32 instructs the mirror controller 33 of the node #1 to perform writing. When the location of the mirror controller 33 is in another node, the virtualization controller 32 instructs the mirror controller 33 of the other node to perform writing. Here, the explanation is made on the case where the identified node is the node #1.

The mirror controller 33 that has received a writing instruction identifies a copy-destination segment (S5), and performs dual writing processing on the respective disk devices 41 that include the identified segment and the segment of the node #1 (S6). Here, the explanation is made assuming that the identified copy-destination segment is included in a disk device 41 of the node #2.

The respective disk devices 41 of the node #1 and the node #2 perform writing (S7 and S8). Subsequently, the mirror controller 33 of the node #1 confirms the completion of the writing in both of the disk devices 41 (S9), and responds to the business server 10.

In this manner, the virtualization controller 32 identifies the location of the mirror controller 33 that manages the converted physical address, and the mirror controller 33 of the node identified by the virtualization controller 32 controls writing including mirroring. Therefore, it is possible for the virtual storage system 1 to prevent the occurrence of mismatching between mirror data.

Figure 5:
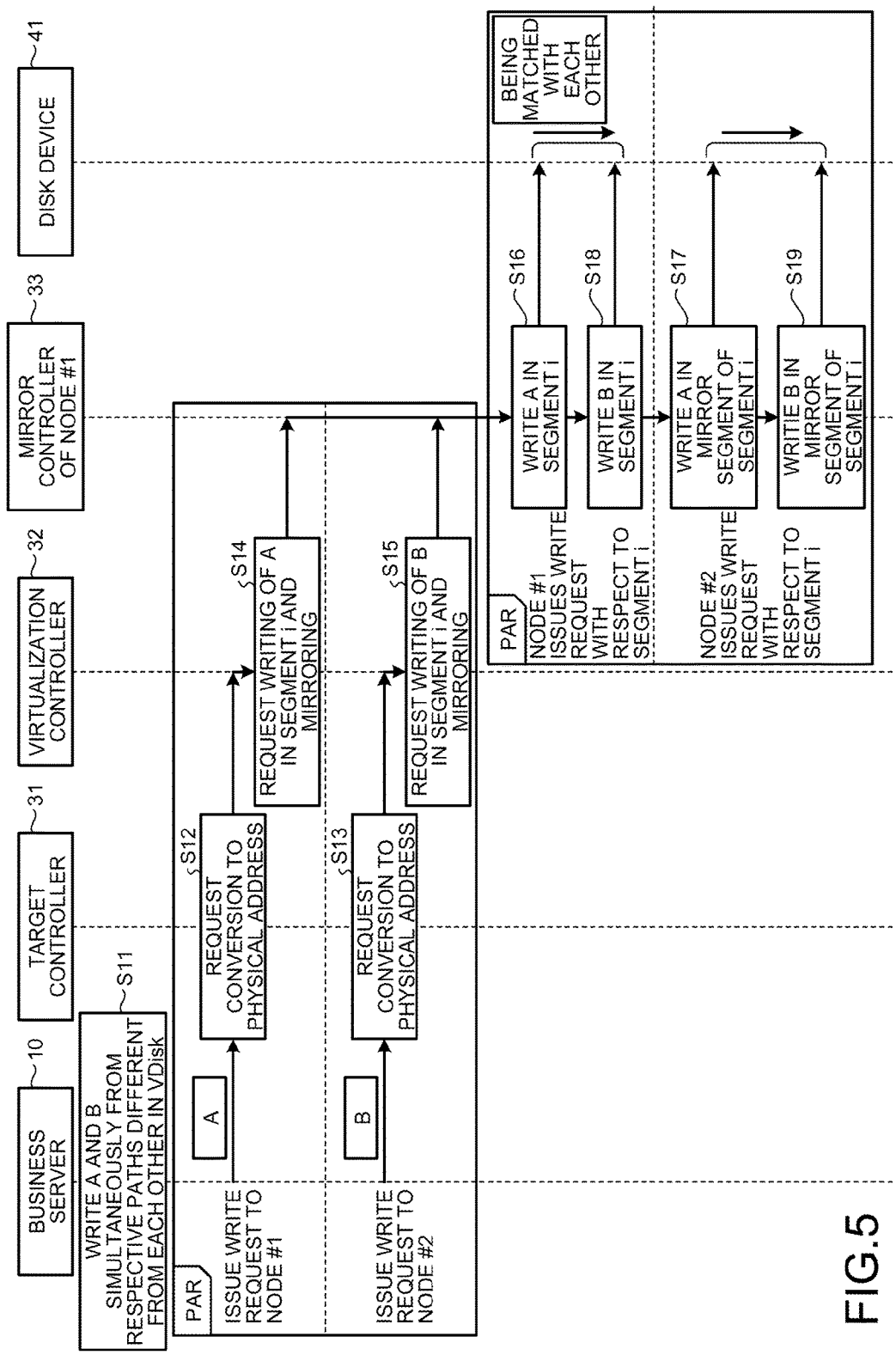
FIG. 5 is a view illustrating a sequence of writing processing in the virtual storage system according to the first embodiment.

Next, the explanation is made on a sequence of writing processing in the virtual storage system 1 according to the first embodiment. FIG. 5 is a view illustrating the sequence of the writing processing in the virtual storage system 1 according to the first embodiment.

As illustrated in FIG. 5, the business server 10 simultaneously writes A and B from respective paths different from each other in the VDisk (S11). To be more specific, the business server 10 issues, to the node #1, a write request for the writing of A, and issues, to the node #2, a write request for the writing of B. In FIG. 5, PAR indicates that two processes surrounded by a rectangle are performed in parallel.

Thereafter, the target controller 31 of the node #1 receives the write request for the writing of A, and requests the virtualization controller 32 to convert an address of a write destination to a physical address (S12). The virtualization controller 32 of the node #1 determines, based on the physical address of a segment i and management information, that the controller 3 of the node #1 manages the segment i. Furthermore, in parallel, the target controller 31 of the node #2 receives the write request for the writing of B, and requests the virtualization controller 32 to convert an address of a write destination to a physical address (S13). The virtualization controller 32 of the node #2 determines, based on the physical address of the segment i and the management information, that the controller 3 of the node #1 manages the segment i.

Accordingly, a mirror controller that performs mirror control is determined from a plurality of controllers that constitute a storage system. Here, the management information includes control information, such as configuration information on a storage system, and it is possible to identify, by referencing the management information, a storage part to which a physical address belongs, the node that manages the storage part belonging to the node, and a controller. Furthermore, the management information is stored in a memory of the controller of each node, or a memory of the basic node in a referable manner by each controller.

The virtualization controller 32 of the node #1 requests the mirror controller 33 of the node #1 to perform writing and mirroring with respect to the segment i (S14). In parallel, the virtualization controller 32 of the node #2 also requests the mirror controller 33 of the node #1 to perform writing and mirroring with respect to the segment i (S15).

The mirror controller 33 of the node #1 writes A in the segment i (S16) and writes A to a mirror segment of the segment i (S17). Thereafter, the mirror controller 33 of the node #1 writes B in the segment i (S18) and writes B in the mirror segment of the segment i (S19).

In this manner, the mirror controller 33 of the node #1 controls writing, including mirroring, of data with respect to the segment i, thus preventing the occurrence of mismatching between mirror data.

As described above, in the first embodiment, the virtualization controller 32 identifies a node 2 that manages a segment to be accessed, and instructs the identified node 2 to access the segment. Furthermore, the mirror controller 33 of the node 2 instructed to access the segment controls, in the case of write access, the writing of data in the segment managed by the node 2 and the segment having a mirror relation with the segment managed by the node 2. Therefore, in the virtual storage system 1, it is possible to control the orders of write access to the nodes 2, and prevent the occurrence of mismatching between mirror data.

The virtual storage system 1 performs striping and hence, when the size of an access request area exceeds a strip size, the virtualization controller 32 divides the access request area to send divided areas to the respective mirror controllers 33 of the nodes 2. Therefore, the nodes 2 are capable of performing parallel processing on an access request and, the virtual storage system 1 is capable of processing the access request at high speed compared with the case where the access request area is not divided.

[b] Second Embodiment

In the method described in the first embodiment, it is possible to perform mirroring without causing mismatching even in an active/active virtual storage system. However, in the method described in the first embodiment, the virtualization controller 32 performs segment conversion of a virtual volume and thereafter, sends data to the mirror controller 33 by using the Internet Small Computer System Interface (iSCSI) for each segment.

Therefore, the mirror controller 33 needs to generate an iSCSI session for each segment. Accordingly, in the method described in the first embodiment, there exists the possibility that the virtual storage system 1 is brought into a high load state by a large quantity of iSCSI sessions.

In order to prevent such a drawback, in the second embodiment, the explanation is made on a method that provides a mirror control LUN that consolidates segments for each node to set an iSCSI session to the virtual LUN target of the mirror control LUN.

Figure 6:
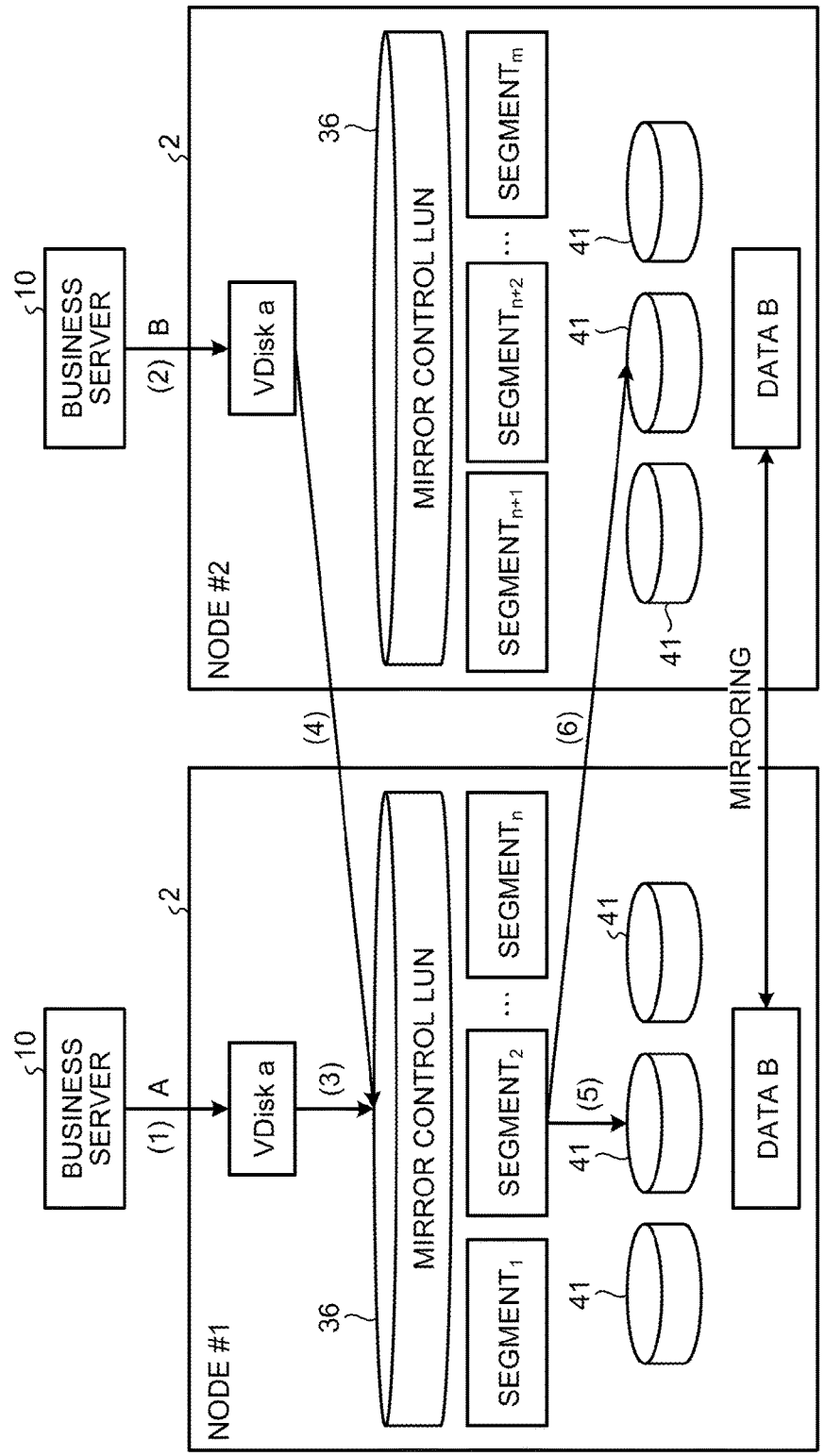
FIG. 6 is a view for explaining mirroring control in a virtual storage system according to a second embodiment.

First of all, mirroring control in a virtual storage system according to the second embodiment is explained. FIG. 6 is a view for explaining the mirroring control in the virtual storage system according to the second embodiment.

In contrast to FIG. 2, a node has a mirror control LUN 36. The mirror control LUN 36 is a virtual storage area for controlling segments managed by each node as a set of segments. Each node does not generate an iSCSI session for each segment to which data is written, but generates the iSCSI session for the mirror control LUN 36.

In this manner, by generating an iSCSI session for the mirror control LUN 36, data can be exchanged simply by generating one iSCSI session between respective nodes.

In this method, a correspondence relation between a mirror control LUN and a segment is not determined at the time of mirror volume generation, but uniquely determined at the design phase. Therefore, the virtual storage system according to the second embodiment does not need communication or updating of the correspondence information of the mirror control LUN and the segment.

Figure 7:
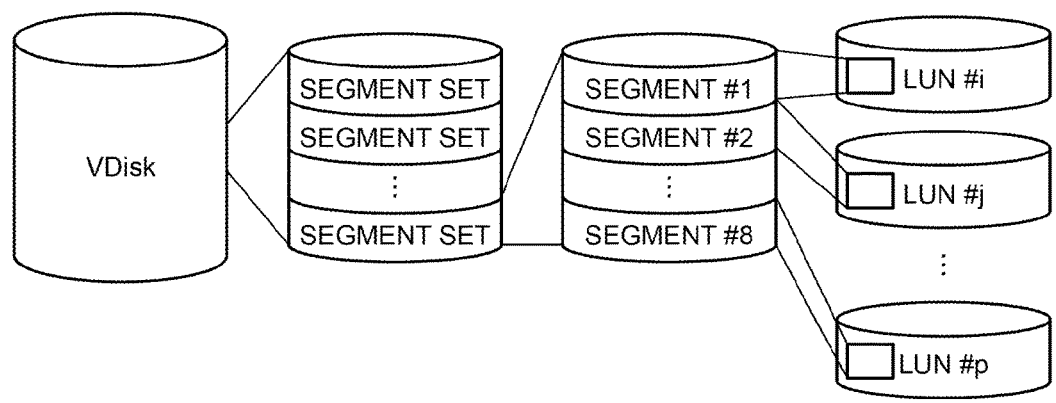
FIG. 7 is a view for explaining a segment set.

Next, segment conversion in the second embodiment is explained. The virtual storage system according to the second embodiment controls, as illustrated in FIG. 7, a virtual volume as a group of a plurality of segment sets. Here, a segment set is a set of eight segments.

Segments are allocated to respective disk devices having LUNs different from each other, by striping. In FIG. 7, a segment #1 is allocated to the disk device of LUN #i, a segment #2 is allocated to the disk device of LUN #j, and a segment #8 is allocated to the disk device of LUN #p.

Figure 8:
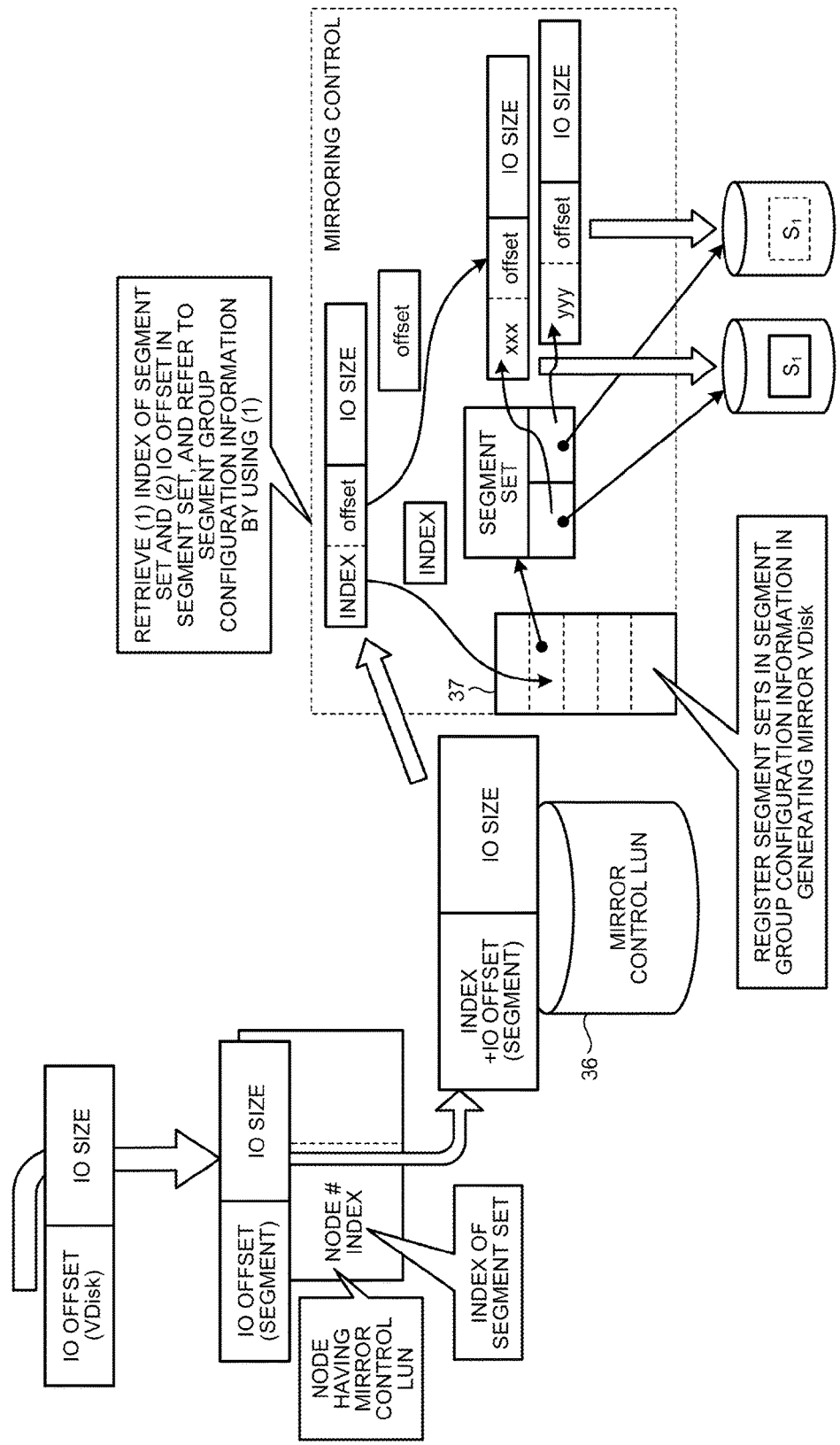
FIG. 8 is a view for explaining segment conversion according to the second embodiment.

FIG. 8 is a view for explaining segment conversion according to the second embodiment. As illustrated in FIG. 8, in accessing a VDisk, an IO offset and an IO size of the VDisk are specified. The virtualization controller 32 converts the IO offset of the VDisk into an offset of a segment, and identifies a node having a mirror control LUN 36 from the offset of the segment.

Furthermore, the virtualization controller 32 identifies the index of the segment set from the identified node, and divides the offset of the segment into the index of the segment set and "offset" that is an IO offset in the segment set.

The mirror controller 33 refers to segment group configuration information 37 by using the index of the segment set to acquire a mirror address pair of xxx and yyy corresponding to the segment set. Furthermore, the mirror controller 33 performs mirroring by using the combination of xxx, "offset," and the IO size, and the combination of yyy, "offset," and the IO size. In FIG. 8, each of two segments to be mirrored is indicated by $S_1$.

Here, as for the segment group configuration information 37, when a mirror VDisk is generated, the information in which a segment set and a mirror address pair are associated with each other is generated. Therefore, the segment group configuration information 37 is fixed information that does not need updating.

When any one of nodes 2 fails, the manager 30 notifies nodes 2 accessed from the business server 10 of the information of the failed node 2, and the nodes 2 exclude the failed node 2 from destinations of an access request. Furthermore, the manager 30 changes the node 2 that manages the LUN, and changes the destination of the access request to another node 2.

In recovering after a node fails, for example, there exists the possibility of the occurrence of the timing that segment group configuration information 37 is unregistered. Accordingly, when an access to the area in which the registration of the segment group configuration information 37 is not completed occurs, the node 2 receives a request and thereafter, requests the manager 30 to notify the node 2 of the segment group configuration information 37.

As described above, in the second embodiment, the virtual storage system generates an iSCSI session for the mirror control LUN 36 that is a set of the segments managed by each node. Therefore, it is possible to prevent the virtual storage system from being brought into a high load state by a large quantity of the iSCSI sessions.

In the second embodiment, the mirror controller 33 refers to the segment group configuration information 37 by using an index of a segment set to acquire a mirror address pair corresponding to the segment set. Here, the segment group configuration information 37 is fixed information determined at a system construction stage. Therefore, the virtual storage system according to the second embodiment does not need the updating of the segment group configuration information 37.

In the first and the second embodiments, the control function of the controller 3 is explained. However, the control function of the controller 3 can be implemented by software, thus a storage control program having a function similar to the control function of the controller 3 is obtained. So, the explanation is made on a hardware configuration of the controller 3 that executes the storage control program.

Figure 9:
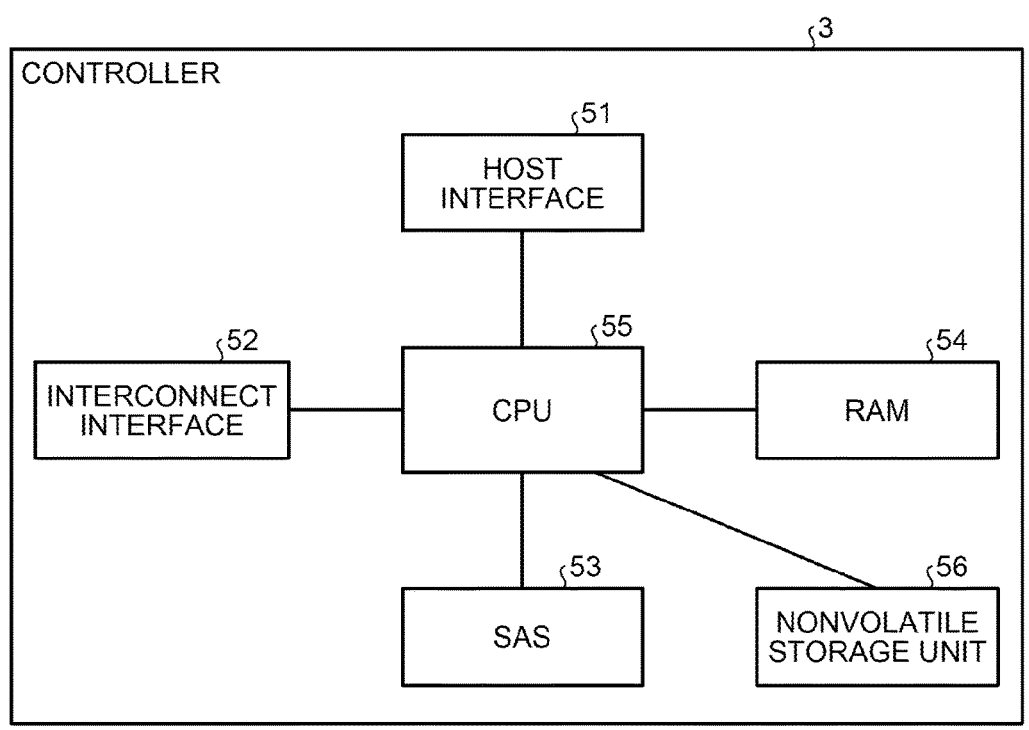
FIG. 9 is a view illustrating a hardware configuration of a controller that executes a storage control program.
Figure 10:
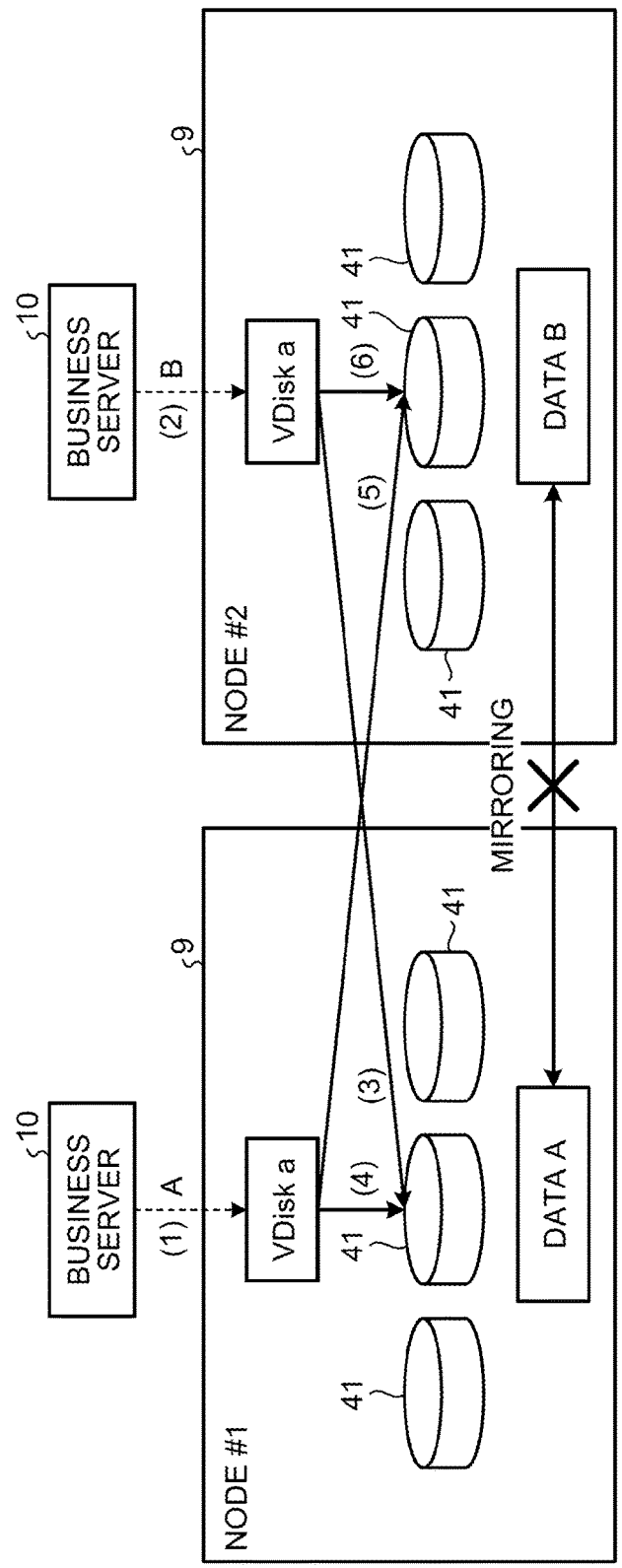
FIG. 10 is a view for explaining a drawback of mirroring in an active/active system.

FIG. 9 is a view illustrating the hardware configuration of the controller 3 that executes the storage control program. As illustrated in FIG. 9, the controller 3 has a host interface 51, an interconnect interface 52, a serial-attached SCSI (SAS) 53, a random access memory (RAM) 54, and a central processing unit (CPU) 55, and a nonvolatile storage unit 56.

The host interface 51 is an interface to the business server 10. The host interface 51 receives an access request from the business server 10 to a virtual storage system, and transmits the result of access processing to the business server 10.

The interconnect interface 52 is an interface to the controller 3 of other nodes 2. The interconnect interface 52 transmits and receives data or a command to and from interconnect interfaces 52 of the other nodes 2. The SAS 53 is an interface to the disk devices 41. The SAS 53 transmits and receives data or a command to and from the disk device 41.

The RAM 54 is a memory that stores therein a computer program, an intermediate result of the program during its execution, or the like. The CPU 55 is a central processing unit that reads out a computer program from the RAM 54 to execute the program. The nonvolatile storage unit 56 is a nonvolatile storage that stores therein a computer program. For example, the nonvolatile storage unit 56 is a hard disk drive (HDD), a flash memory, or the like. Furthermore, the storage control program is stored in the nonvolatile storage unit 56, read out to the RAM 54, and executed by the CPU 55.

In the first and the second embodiments, the scale-out type virtual storage system is explained. However, the present invention is not limited to the embodiments, and also capable of being applied to a non-scale-out type virtual storage system.

In the first and the second embodiments, the explanation is made on the case that a segment is set as a unit of storage in a storage device. However, the present invention is not limited to the embodiments, and also capable of being applied to the case in which any other unit area is set as the unit of storage in the storage device.

Furthermore, in the first and the second embodiments, the explanation is made on the case that a disk device 41 is used as a storage device. However, the present invention is not limited to the embodiments, and also capable of being applied to the case in which a solid state drive (SSD) or the like is used as a storage device.

According to one embodiment, it is possible to prevent the occurrence of mismatching between mirror data.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage apparatus that constitutes a storage system in cooperation with other storage apparatuses each including a controller that is capable of receiving an access request and performing certain processing on the access request, the storage apparatus comprising:
   a storage that stores therein data in a predefined unit of storage; and
   a controller that is capable of receiving a write access request to the storage system, and performing a mirror control on the write access request, wherein
   the controller performs, when receiving a write access request, processing for identifying a controller connected to a mirror destination storage, out of a plurality of controllers of storage apparatuses that constitute the storage system, that performs the mirror control on the write access request when the controller is identified, by the processing for identifying, and received the write access request to perform the mirror control, and
   when identified, by the processing for identifying, that another controller is a controller that performs the mirror control, the controller instructs other controller to write data in a virtual storage area in which a plurality of units of storage managed by the other controller are grouped, and causes the other controller to perform the mirror control corresponding to the instruction of writing data based on two mirror addresses fixedly associated with an address specified in instructing to perform writing of data in the virtual storage area.

2. The storage apparatus according to claim 1, wherein when size of an access request area exceeds the predefined unit of the storage, the controller divides the access request area.

3. A storage system constituted by a plurality of storage apparatuses, each storage apparatus comprising:
   a storage that stores therein data in a predefined unit of storage; and
   a controller that is capable of responding to a write access request to the storage system, and performing a mirror control on the write access request, wherein
   one controller that has received a write access request to the storage system out of controllers of the storage apparatuses performs processing for identifying, according to the write access request, a controller connected to a mirror destination storage, out of the controllers of the storage apparatuses that constitute the storage system, that performs the mirror control on the write access request when the controller is identified, by the processing for identifying, and received the write access request to perform the mirror control, and
   when identified, by the processing for identifying, that another controller is a controller that performs the mirror control, the controller instructs other controller to write data in a virtual storage area in which a plurality of units of storage managed by the other controller are grouped, and causes the other controller to perform the mirror control corresponding to the instruction of writing data based on two mirror addresses fixedly associated with an address specified in instructing to perform writing of data in the virtual storage area.

4. A non-transitory computer-readable storage medium storing a storage control program executed by a computer of a first controller of a first storage apparatus that constitutes a storage system in cooperation with a second storage apparatus including a second controller that is capable of responding to a write access request and performing a mirror control on the write access request, the computer-readable storage medium causing the computer to execute:

processing for identifying, when the first controller receives a write access request to the storage system, a controller connected to a mirror destination storage, out of controllers of a plurality of storage apparatuses that constitute the storage system, that performs the mirror control on the write access request when the first controller is identified, by the processing for identifying, as a controller that performs the mirror control, and when identified, by the processing for identifying, that the second controller is a controller that performs the mirror control, instructing the second controller to write data in a virtual storage area in which a plurality of units of storage managed by the second controller are grouped, and causing the second controller to perform the mirror control corresponding to the instruction of writing data based on two mirror addresses fixedly associated with an address specified in instructing to perform writing of data in the virtual storage area.

* * * * *